Oct. 30, 1956  F. G. PRATER  2,768,837
CONDITION RESPONSIVE DRAFT ASSEMBLY WITH SNUBBING MEANS
Filed Aug. 5, 1954  5 Sheets-Sheet 1

INVENTOR.
Lloyd G. Prater
BY
Atty.

INVENTOR.
Lloyd G Prater

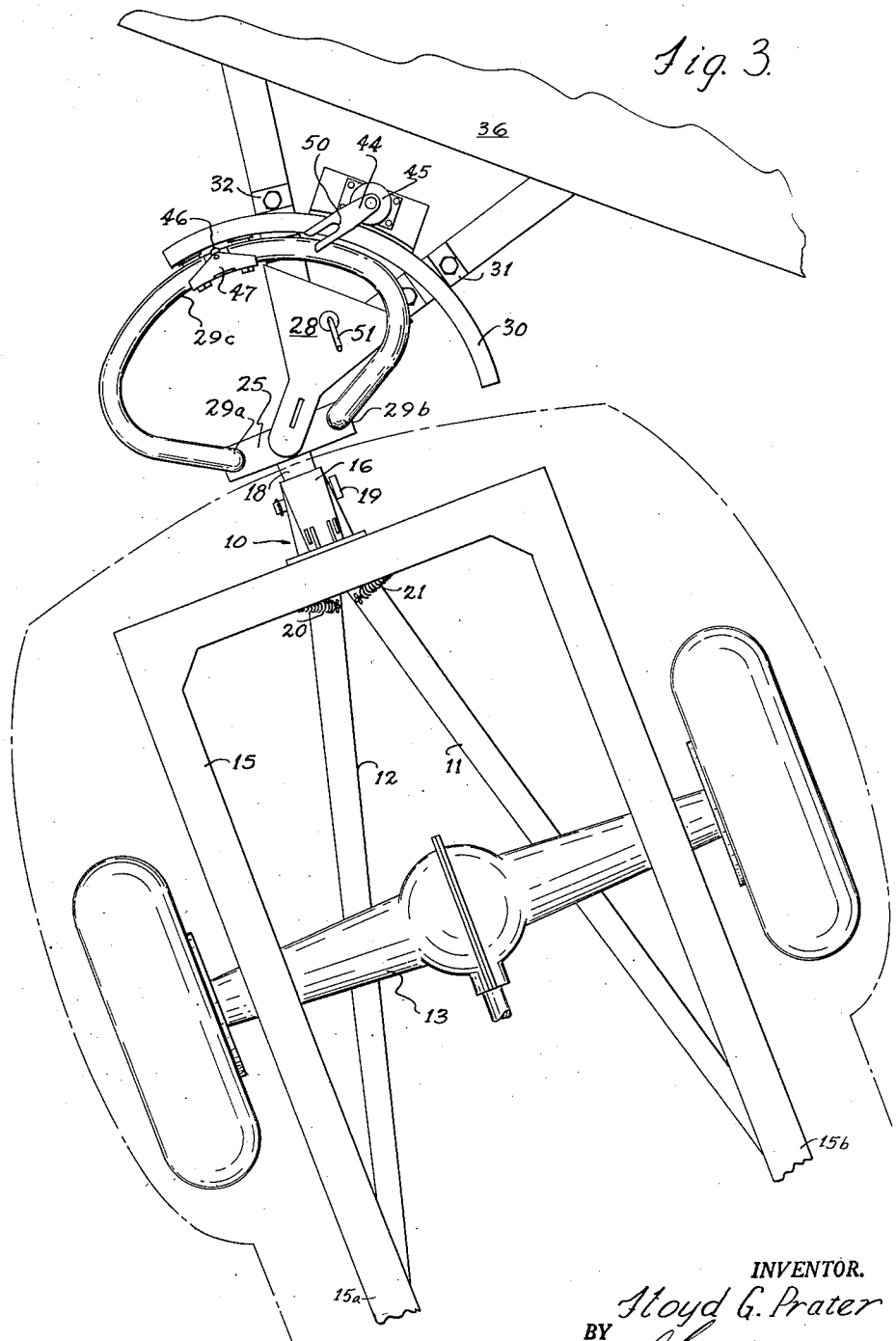

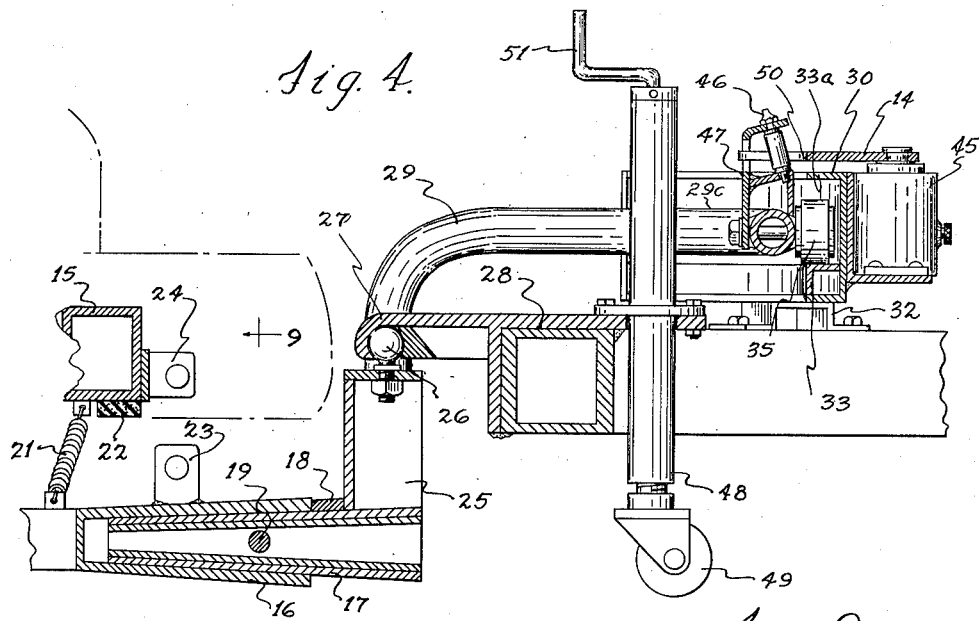
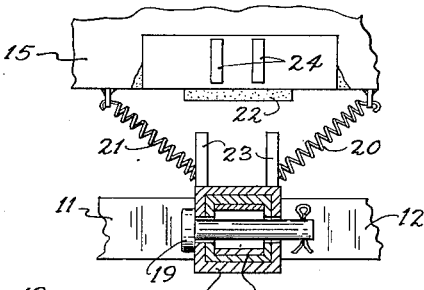
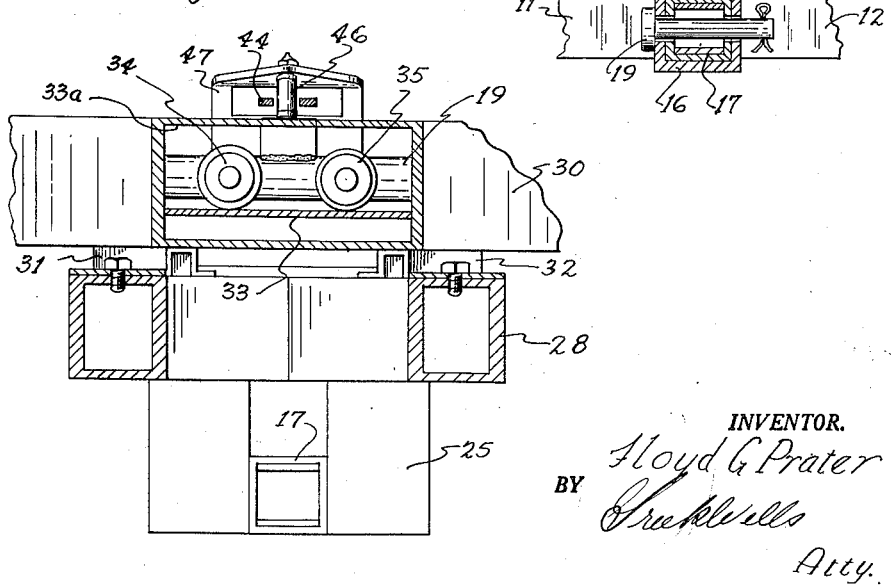

Oct. 30, 1956 F. G. PRATER 2,768,837
CONDITION RESPONSIVE DRAFT ASSEMBLY WITH SNUBBING MEANS
Filed Aug. 5, 1954 5 Sheets-Sheet 5
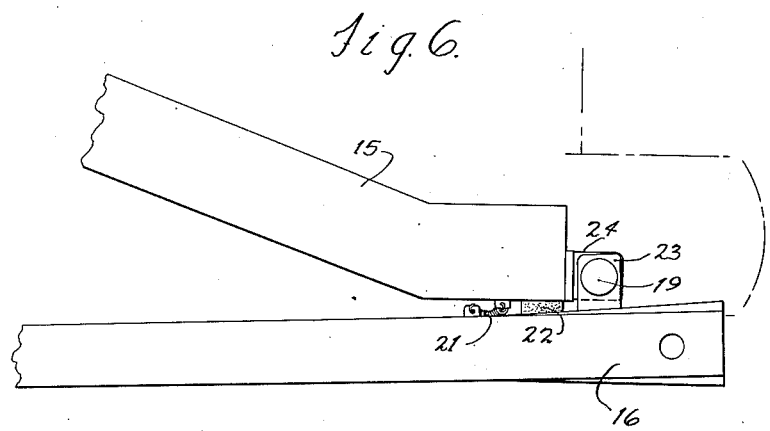
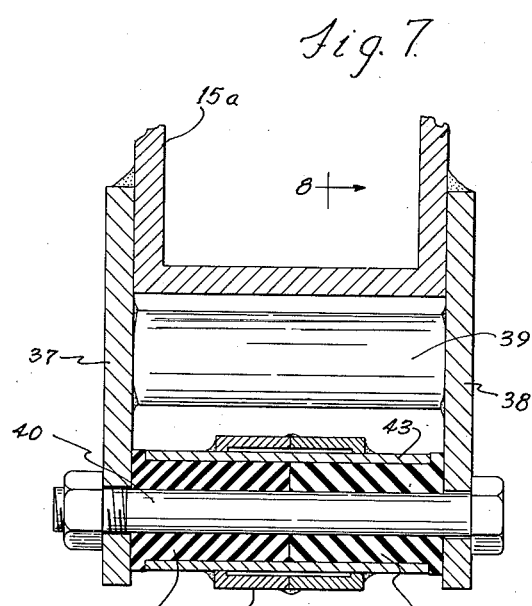
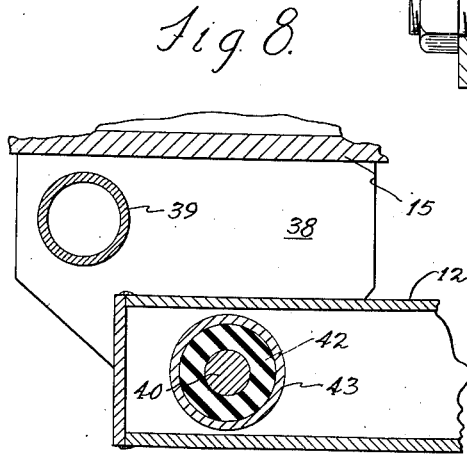
INVENTOR.
Lloyd G. Prater
BY
Atty.

United States Patent Office 2,768,837
Patented Oct. 30, 1956

2,768,837

CONDITION RESPONSIVE DRAFT ASSEMBLY WITH SNUBBING MEANS

Floyd G. Prater, Anatone, Wash.

Application August 5, 1954, Serial No. 448,013

7 Claims. (Cl. 280—446)

My invention relates to a trailer hitch adapted to connect a two wheel trailer such as a house trailer, to a towing vehicle. Trailers that are used for dwellings have increased in size until they are many times larger than the vehicle which tows them. They do present a difficult problem in how to attach them to the towing vehicle which may weigh much less than the trailer itself, in order to have reasonable safety when the vehicle is being towed along a highway. It is well known to those who have driven automobiles towing these trailers, that the tendency of the heavy trailer to take charge and deflect the automobile is quite pronounced. For example, the trailer when hit by a gust of wind, may set up a swaying motion that requires very careful and difficult driving to keep the automobile and trailer on the road. The trailer is of course, pivoted by its tongue to the towing vehicle so as to be able to turn. Desirably this pivot point should be well behind the rear wheels of the towing vehicle so that as the vehicle turns, the trailer will be caused to ride toward the outside of the curve and thus follow in the path of the towing vehicle. A towing automobile turns about its rear wheels so the trailer is guided out to the outside of the curve by an amount which is proportional to the distance from the rear axle of the towing vehicle to the pivot of the tongue of the trailer to the towing vehicle.

The two wheel trailer exerts a downward pressure on the towing vehicle because of the fact that the front portion of the trailer ahead of its two wheels is made substantially heavier than the portion behind its wheels. If this load is applied at a distance behind the rear axle of the towing vehicle, it tends to tip the vehicle about the rear wheels so as to provide too little pressure on the front wheels of the vehicle for adequate steering or braking. One can overcome the tendency to lift the front end of the automobile by putting an extension on the trailer tongue and attaching it to the towing vehicle in front of the rear axle thereof. When this is done, however, the advantage of having connection between the towing vehicle and the trailer at a point behind the rear axle to lead the trailer out on the curves, will be lost.

One purpose of the present invention is to provide a trailer hitch, one part of which is suspended on the towing vehicle and the other part of which is on the tongue of the trailer, the two parts being so connected as to provide the necessary stiffness to carry the load of the trailer on the tongue forward to a suspension point well in front of the rear axle of the towing vehicle, while providing for pivotal movement about an upright axis between the trailer and the towing vehicle at a point behind the rear axle of the towing vehicle a substantial distance.

It is also a purpose of my invention to provide a trailer hitch of the character above described in which the connection between the trailer tongue and the part of the hitch that is attached to the towing vehicle provides a corrective loading of the high side of the towing vehicle whenever one side of the vehicle drops any substantial amount with respect to the plane occupied by the tongue and its connection to the towing vehicle. The larger house trailers are now so constructed as to provide a so called level axle which means that the tendency of the trailer to rock from one side to the other is curbed in such a fashion as to maintain the axle from which the trailer tongue leads, substantially level with the load. However, when a towing vehicle is turning, the pull of the trailer being directed at an angle to the vehicle, may cause one side or the other of the towing vehicle to be lowered excessively. My invention provides means whereby a corrective force is set up in the connection to oppose the action just described.

It is a further purpose of my invention to provide in a trailer hitch a novel means for resisting and opposing the tendency of the trailer to sway to and fro about its pivotal connection to the towing vehicle, which means does not interfere with the turning of the towing vehicle with respect to the trailer that is necessary in maneuvering sharp curves or in locating the trailer in a parking place.

The nature and advantages of my invention will appear more fully from the following description and the accompanying drawings wherein a preferred form of the invention is illustrated. It should be understood, however, that the drawings and description are illustrative only and are not intended to limit the invention except insofar as it is limited by the claims.

In the drawings:

Figure 3 is a plan view similar to Figure 1 but showing the parts in a different position;

Figure 4 is an enlarged sectional view taken on the line 4—4 of Figure 1;

Figure 5 is an enlarged sectional view taken on the line 5—5 of Figure 1;

Figure 6 is a fragmentary view in side elevation of the frame on the rear end of the towing vehicle, showing how that part of the trailer hitch carried by the towing vehicle is latched up out of the way when it is not attached to a trailer;

Figure 7 is an enlarged sectional view taken on the line 7—7 of Figure 1;

Figure 8 is a sectional view taken on the line 8—8 of Figure 7; and

Figure 9 is a sectional view taken on the line 9—9 of Figure 4.

Figure 1:
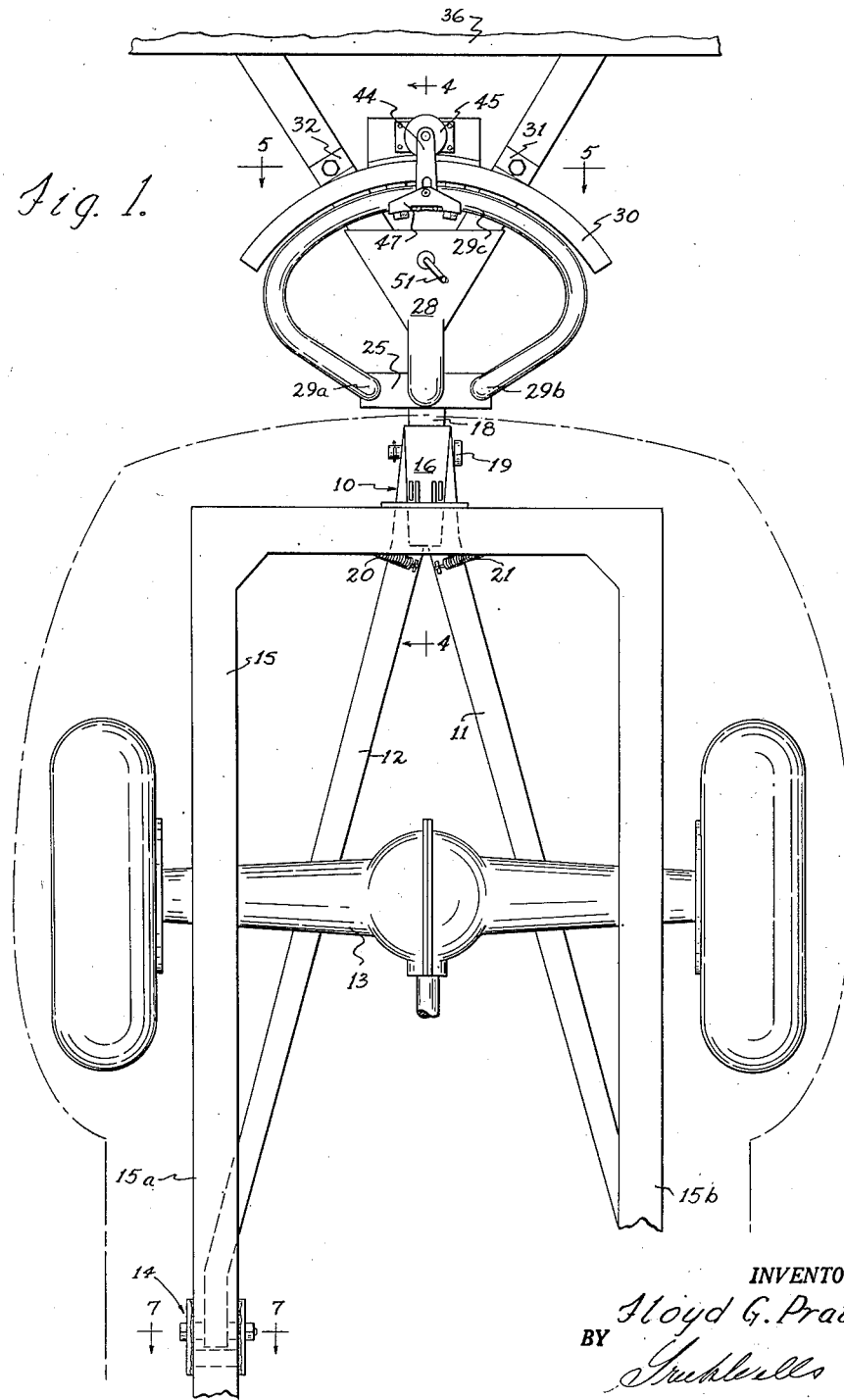
Figure 1 is a plan view of the rear portion of a towing vehicle frame and the tongue of a trailer connected by my improved trailer hitch, the body of the towing vehicle being shown by broken lines.

Referring now in detail to the drawings, my improved trailer hitch embodies a Y-shaped frame 10 which has its arms 11 and 12 extending beneath the rear axle 13 of the towing vehicle and pivoted to the towing vehicle frame 15 forwardly of the rear axle 13 by pivot means 14 which is shown in detail in Figures 7 and 8.

The arms 11 and 12 extend rearwardly below the rear axle 13 and are joined together to provide an attaching stem 16 that extends rearwardly beyond the rear end of the vehicle frame 15. The attaching stem 16 is tubular and polygonal in cross section. It is also tapered to increase in cross sectional area rearwardly so as to receive a correspondingly shaped and tapered connecting bar 17. The connecting bar 17 has a stop block 18 thereof (see Figure 4) to prevent its wedging in the tubular member 16. A pin 19 is used to secure the bar 17 in the stem 16.

The Y-shaped frame 10 is yieldingly suspended from the vehicle frame 15 by two springs 20 and 21. A rubber bumper 22 is provided on the under face of the frame 15 to act as a stop when the frame 10 is raised too high. Whenever the frame 10 is not attached to a trailer, it can be locked in elevated position by using the pin 19 to pass through ears 23 on the stem 16 and corresponding ears 24 provided on the frame 15.

The connection bar 17 carries a bracket 25 which extends transversely of the bar 17 and upwardly from it to mount a ball 26 that receives a socket 27 which is carried by the front end of the trailer tongue 28. The ball and socket joint 26—27 is of conventional construction and will not be described in detail. The bracket 25 also carries a rigid load transmitting member 29 which is in the form of a tube bent to a loop shape. The ends of the tube 29a and 29b are fixed to the bracket 25 and project upwardly from it. The mid portion 29c of the member 29 is curved about a vertical line through the ball and socket joint 26—27 as a center. A second load transmitting member 30 is fixed to the tongue 28 rearward of the ball and socket joint 26—27 and is curved about the same center line as the portion 29c. The member 30 is welded to two attaching brackets 31 and 32 that are bolted to the top of the tongue 28. The member 30 has a guide rail 33 which supports two rollers 34 and 35 that are carried by the member 29. These rollers provide a means riding on the rail 33 to limit the downward sagging at the ball and socket joint between the frame 10 and the tongue 28.

Figure 2:
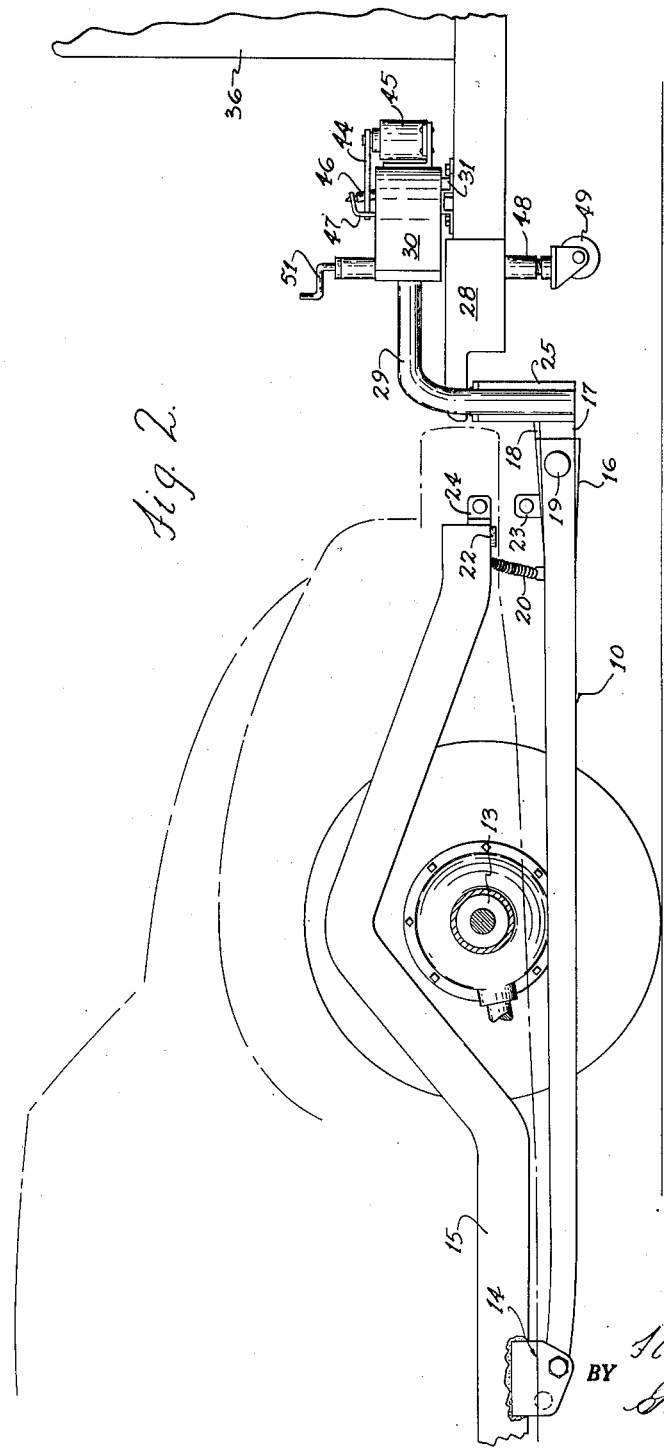
Figure 2 is a view in side elevation of the trailer hitch showing it applied to the towing vehicle frame and the tongue of the trailer.

It will be appreciated that the tongue 28 carries a substantial part of the weight of the trailer, the front end of which is indicated at 36 in Figures 1, 2 and 3. This weight would push the connection between the Y-shaped frame 10 and the tongue 28 down to the ground if it were not for the load transmitting members 29 and 30 and their engagement through the rail 33 and the rollers 34 and 35. With this connection, however, the towing vehicle can turn to right or left with respect to the tongue 28 about the pivot point established by the ball and socket members 26 and 27. Insofar as the vertical loading is concerned the connection between the frame 10 and the tongue 28 just described, is substantially rigid so as to transmit the tongue load to the towing vehicle frame 15 at the connecting points 14. Thus the weight on the front end of the tongue 28 is transmitted forwardly through the Y-frame 10 to the frame 15 of the towing vehicle at a point substantially forward of the rear axle 13. However, when the towing vehicle is turned to right or left with respect to the trailer, the pivotal connection at the ball and socket joint 26—27 leads the tongue 28 out with respect to the towing vehicle because this connection is at a point a substantial distance behind the rear axle 13 of the towing vehicle.

The particular connection of the arms 11 and 12 of the Y-frame to the frame 15 is illustrated in Figures 7 and 8. Two plates 37 and 38 are welded on each of the side frame members 15a and 15b of the frame 15. These plates are braced by a tubular cross brace 39. A pivot pin 40 extends through the plates and extend through rubber bushings 41 and 42 which are seated in a metal tube 43 that is welded in the front end of each of the arms 11 and 12. The construction of the arms 11 and 12 is box shaped in cross section and the arms 11 and 12 are tapered so that they reduce in cross section toward their free ends. They are square in cross section and are constructed of a high tensile strength steel to withstand the bending stresses to which they are subjected. It will be appreciated that under the load of a heavy trailer they may flex slightly and they are so constructed as to withstand the twisting and bending forces that may be communicated to them through the members 16 and 17 that connect them to the bracket 25.

The rollers 34 and 35 are spaced apart on opposite sides of a vertical plane taken centrally through the members 16 and 17. The member 30 which carries the rail 33 is a channel in cross section so as to provide a top rail 33a to limit the upward movement of the rollers 34 and 35 in the event that the tongue 28 should exert a lifting force on the bracket 25 instead of the usual downward force. The spaced apart rollers 34 and 35 also provide a bearing means on the rail 33 that acts to increase the load on the high side and decrease the load on the low side of the vehicle frame 15 in the event that the vehicle frame turns on a longitudinal axis with respect to the trailer tongue. Such a turning movement will lift one of the rollers away from the rail 33 which will result in transmitting the load more to the high side of the towing vehicle because the other roller will have the entire load and the line of force transmission will be shifted.

The members 29 and 30 also carry means for resisting side sway of the trailer with respect to the towing vehicle. This means is so constructed as to release itself whenever a turn of several degrees is being made and to become operative again when the towing vehicle is again aligned with the trailer. As shown best in Figures 1 to 4 inclusive, the sway preventing mechanism comprises a yoke 44 which is mounted on a snubber unit 45, and a pin 46 which is mounted on a bracket 47 that is carried by the member 29. The yoke 44 is bifurcated as indicated at 50 so as to receive the pin 46 when the parts are in the position shown in Figure 1. The snubber 45 resists movement of the yoke 44 in either direction and it is so constructed as to have maximum resistance to displacement of the yoke in either direction when the parts are in the position shown in Figure 1. Now if the towing vehicle turns with respect to the tongue 28, the pin 46 will turn the yoke 44 and the effective length of the yoke 44 with respect to its pivot increases rapidly in either direction from the center position. As soon as the turning movement proceeds far enough, the pin 46 moves out of the yoke 44 and is, of course, entirely free of the resistance of the yoke to turning. The yoke 44 stays in the position where it is left so that upon return movement of the towing vehicle toward alignment with the tongue, the pin 36 again engages the yoke 44 and again becomes the means with the yoke 44, to prevent side sway.

Owing to the particular connection between the members 29 and 30, it is necessary to set the pin 46 at a slight angle to the vertical. If, for example, the towing vehicle is turning and the load is such that one of the rollers 34 or 35 is elevated, this might move the pin 46 out so far that it would not catch the yoke 44 as the towing vehicle straightened up. By setting the pin 46 in a position where it is substantially perpendicular to a line through the ball 26 and the point of engagement of the rollers 34 and 35 with the rail 33, the up and down movement of the rollers 34 and 35 with respect to the rail 33 cannot move the pin 36 out far enough to prevent proper engagement in the yoke 44. It will be appreciated that any particular mechanism 45 may be used which will exert opposition to the turning of the yoke 44 to right or left from its center position and which will hold the yoke 44 stationary when it is released from the pin 46. The hydraulic snubbers 45 which I use for this purpose are common in the automotive trade.

The trailer is shown in Figures 2 and 4 as being equipped with a suitable jack 48, provided with a caster wheel 49, for lifting the tongue 28 and supporting it whenever the trailer is to be disconnected from the towing vehicle. The jack 48 is operated by a handle 51. The construction of this jack is well known and will not be described further. A jack of this nature is illustrated in U. S. Patent No. 2,638,315.

It is believed that the nature and advantages of my invention will be apparent from the foregoing description.

Having thus described my invention, I claim:

1. In a trailer hitch for connecting a tongue of a two wheel trailer to a towing vehicle such as an automobile, the combination of a Y-shaped frame having its arms provided with pivot means at their free ends pivoted to the towing vehicle forwardly of its rear axle, said arms extending rearwardly below said rear axle of the towing vehicle and being joined together, the frame having an attaching stem extending rearwardly from the junction of the arms, said stem having means for slidably and nonrotatably receiving a connecting bar attached to the trailer, a bracket to which said bar is fixed, a ball and socket joint connecting the tongue and the bracket for lateral turning movement, a rigid load transmitting member fixed to the bracket and extending rearwardly to overlap the tongue, a second load transmitting member fixed on the tongue rearwardly of the ball and socket joint, one of said load transmitting members having a transverse guide rail curved about the ball and socket joint as a center, the other load transmitting member having means riding on said curved rail to limit downward sagging of the joint between the Y-shaped frame and the tongue whereby to transmit vertical force from the tongue through the Y-shaped frame to the towing vehicle forwardly of its rear axle.

2. In a trailer hitch for connecting a tongue of a two wheel trailer to a towing vehicle such as an automobile, the combination of a Y-shaped frame having its arms provided with pivot means at their free ends pivoted to the towing vehicle forwardly of its rear axle, said arms extending rearwardly below said rear axle of the towing vehicle and being joined together, the frame having an attaching stem extending rearwardly from the junction of the arms, said stem having means for slidably and nonrotatably receiving a connecting bar attached to the trailer, a bracket to which said bar is fixed, a ball and socket joint connecting the tongue and the bracket for lateral turning movement, a rigid load transmitting member fixed to the bracket and extending rearwardly to overlap the tongue, a second load transmitting member fixed on the tongue rearwardly of the ball and socket joint, one of said load transmitting members having a transverse guide rail curved about the ball and socket joint as a center, the other load transmitting member having transversely spaced rollers riding on said curved rail to limit downward sagging of the joint between the Y-shaped frame and the tongue whereby to transmit vertical force from the tongue through the Y-shaped frame to the towing vehicle forwardly of its rear axle.

3. In a trailer hitch for connecting a tongue of a two wheel trailer to a towing vehicle such as an automobile, the combination of a Y-shaped frame having its arms provided with pivot means at their free ends pivoted to the towing vehicle forwardly of its rear axle, said arms extending rearwardly below said rear axle of the towing vehicle and being joined together, the frame having an attaching stem extending rearwardly from the junction of the arms, said stem having means for slidably and nonrotatably receiving a connecting bar attached to the trailer, a bracket to which said bar is fixed, a ball and socket joint connecting the tongue and the bracket for lateral turning movement, a rigid load transmitting member fixed to the bracket and extending rearwardly to overlap the tongue, a second load transmitting member fixed on the tongue rearwardly of the ball and socket joint, one of said load transmitting members having a transverse guide rail curved about the ball and socket joint as a center, the other load transmitting member having means riding on said curved rail to limit downward sagging of the joint between the Y-shaped frame and the tongue whereby to transmit vertical force from the tongue through the Y-shaped frame to the towing vehicle forwardly of its rear axle, and means on the load transmitting members, yieldingly opposing movement of the tongue and trailer out of alignment with the towing vehicle, said means operable to disengage at a predetermined angle.

4. In a trailer hitch for connecting a tongue of a two wheel trailer to a towing vehicle such as an automobile, the combination of a connecting bar, pivoted to the towing vehicle for up and down movement and extending rearwardly, pivot means connecting said bar to the tongue for lateral turning movement, a rigid load transmitting member fixed to the bar and extending rearwardly to overlap the tongue, a second load transmitting member fixed on the tongue and spaced rearwardly from said pivot means, one of said members having thereon a transverse guide rail curved about the pivot means as a center, the other load transmitting member having means bearing on said rail, whereby to transmit load from the tongue through the frame to the towing vehicle, a bifurcated yoke pivoted on the rail carrying member, a snubber connected to the yoke and yieldingly opposing movement of the yoke, and a pin on the other member for engaging the yoke.

5. In trailer hitch for connecting a tongue of a trailer vehicle to a towing vehicle, a connecting frame having forwardly extending diverging arms and having a rearwardly extending connecting stem, said frame being positioned beneath the rear axle of the towing vehicle and the forward ends of said arms being pivoted to the towing vehicle forwardly of the rear axle, said stem slidably but non-rotatably receiving a connecting bar, means to secure the bar to the stem, a bracket fixed to said bar, a ball member mounted on said bracket, a socket member secured to the forward end of the tongue and interengaged with the ball to secure the trailer to the connecting frame, a load transmitting member attached to the bracket and extending rearwardly adjacent the tongue, a second load transmitting member secured to the tongue rearwardly of the socket, one of said load transmitting members having a guide rail thereon curved about the ball and socket as a center, the other of said load transmitting members having a pair of transversely spaced rollers riding on said guide rail whereby to prevent downward sagging of the ball and socket joint and to resist longitudinal twisting between the trailer and the towing vehicle, one of said load transmitting members having a snubber unit secured thereon, said snubber unit having a bifurcated yoke attached thereto, said snubber unit yieldingly opposing horizontal pivoting of said yoke, a pin on the other load transmitting member, said pin engaging the yoke when the trailer and towing vehicle are longiutdinally aligned, the total length of the yoke being greater than the distance between the snubber and the pin whereby to maintain engagement of the pin and yoke for a predetermined amount of angular displacement between the trailer and towing vehicle.

6. In a trailer hitch for connecting a tongue of a trailer vehicle to a towing vehicle, a connecting frame having forwardly extending diverging arms and having a rearwardly extending connecting stem, said frame being positioned beneath the rear axle of the towing vehicle and the forward ends of said arms being pivoted to the towing vehicle forwardly of the rear axle, said stem slidably but non-rotatably receiving a connecting bar, means to secure the bar to the stem, a bracket fixed to said bar, a ball member mounted on said bracket, a socket member secured to the forward end of the tongue and interengaged with the ball to secure the trailer to the connecting frame, a load transmitting member attached to the bracket and extending rearwardly over the tongue, a second load transmitting member secured to the tongue rearwardly of the socket, said second load transmitting member having a guide rail thereon curved about the ball and socket as a center, the load transmitting member on the bracket having two transversely spaced rollers attached thereto, and riding on the guide rail whereby to prevent downward sagging of the ball and socket joint and to resist longitudinal twisting between the trailer and the towing vehicle, a snubber unit secured to the second load transmitting member adjacent the guide rail, the snubber unit having a bifurcated yoke pivoted thereto and extending over the guide rail, said snubber unit operable to yieldingly oppose horizontal pivoting of the yoke, a pin mounted on the load transmitting member attached to the bracket, said pin being received by the bifurcated yoke when the trailer and towing vehicle are in longitudinal alignment, the length of the yoke being greater than the distance from the pin to the snubber whereby to maintain engagement of the yoke and the pin for a predetermined amount of angular displacement between the trailer and the towing vehicle.

7. In a trailer hitch for connecting a tongue of a two wheel trailer to a towing vehicle such as an automobile, the combination of a connecting bar, pivoted to the towing vehicle for up and down movement and extending rearwardly, pivot means connecting said bar to the tongue for lateral turning movement, a rigid load transmitting member fixed to the bar and extending rearwardly to overlap the tongue, a second load transmitting member fixed on the tongue and spaced rearwardly from said pivot means, one of said members having thereon a transverse guide rail curved about the pivot means as a center, the other load transmitting member having means bearing on said rail, whereby to transmit load from the tongue through the frame to the towing vehicle, one of said load transmitting members having a snubber unit secured thereon, said snubber unit having a bifurcated yoke attached thereto, said snubber unit yieldingly opposing horizontal pivoting of said yoke, a pin on the other load transmitting member, said pin engaging the yoke when the trailer and towing vehicle are longitudinally aligned, the total length of the yoke being greater than the distance between the snubber and the pin whereby to maintain engagement of the pin and the yoke for a predetermined amount of angular displacement between the trailer and towing vehicle.

References Cited in the file of this patent

UNITED STATES PATENTS

| | | |
|---|---|---|
| 1,607,786 | Winsor et al. | Nov. 23, 1926 |
| 1,637,665 | Stone | Aug. 2, 1927 |
| 2,517,047 | Spitler | Aug. 1, 1950 |
| 2,572,341 | Hoffman | Oct. 23, 1951 |